C. E. SCOTT.
TREAD FOR RAILS AND WHEELS.
APPLICATION FILED APR. 13, 1921.
1,420,389.
Patented June 20, 1922.
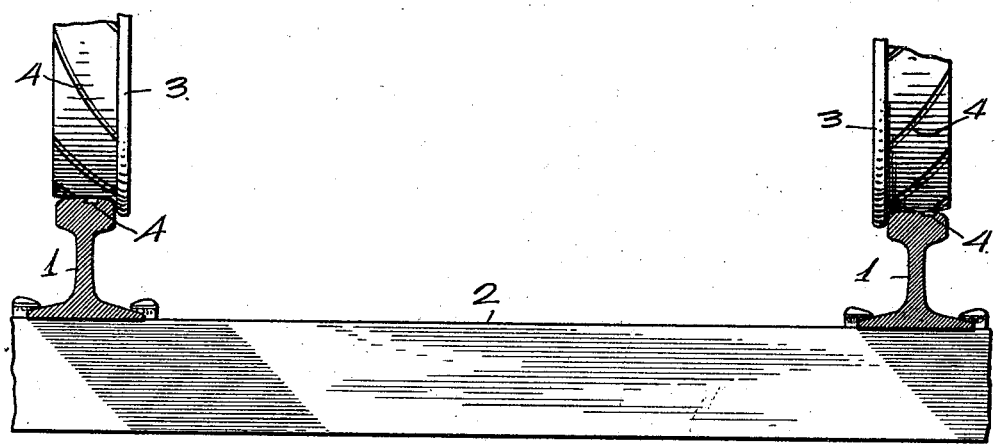
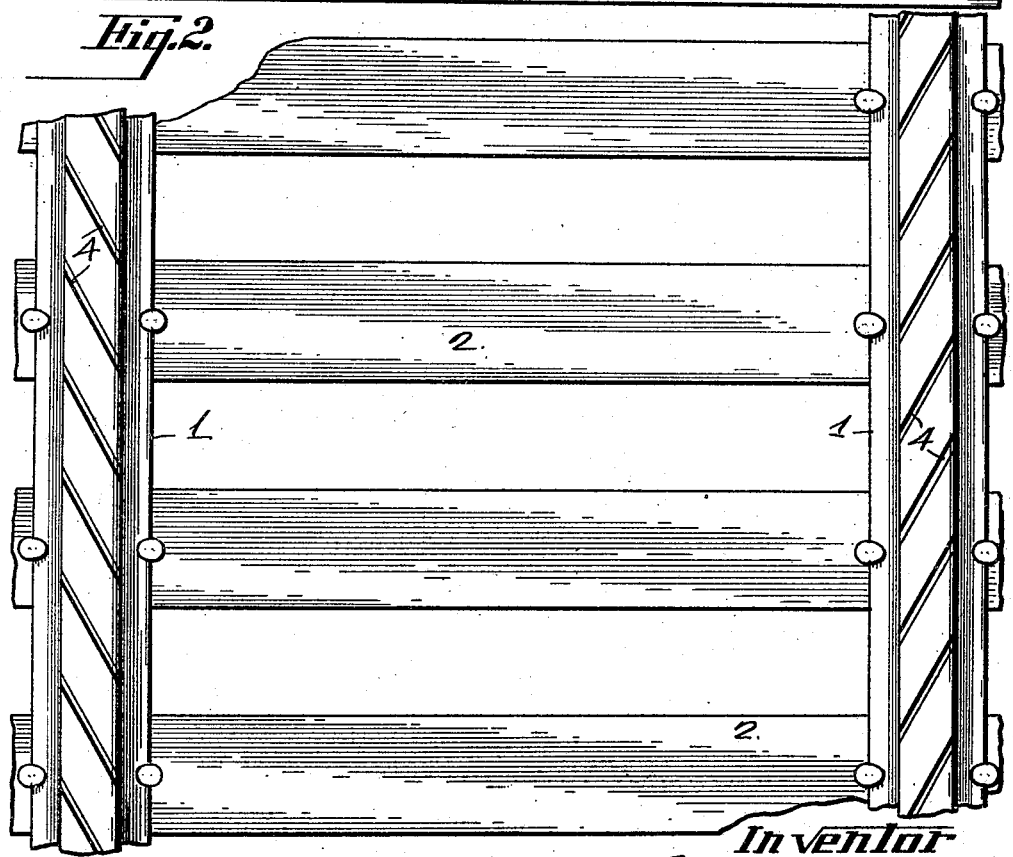
Inventor
Charles E. Scott
By Arthur L. Slee
Atty

UNITED STATES PATENT OFFICE.

CHARLES E. SCOTT, OF SAUSALITO, CALIFORNIA.

TREAD FOR RAILS AND WHEELS.

1,420,389.   Specification of Letters Patent.   Patented June 20, 1922.

Application filed April 13, 1921. Serial No. 460,972.

*To all whom it may concern:*

Be it known that I, CHARLES E. SCOTT, a citizen of the United States, residing in the town of Sausalito, and county of Marin, State of California, have invented a new and useful Improvement in Treads for Rails and Wheels, of which the following is a specification.

My invention relates to improvements in treads for rails and wheels arranged to ride thereupon wherein either one of said treads is provided with parallel inclined grooves to provide edges to increase traction and to prevent lateral movement of a pair of wheels relatively to the rails upon which they are riding.

The primary object of the present invention is to provide a new and improved tread for wheels and rails;

I accomplish these and other objects by means of the improved device disclosed in the drawings forming a part of the present specification wherein like characters of reference are used to designate similar parts throughout the said specification and drawings, and in which:

Fig. 1 is a broken transverse sectional view of a pair of rails with a portion of a pair of wheels disclosed mounted thereon; and Fig. 2 is a plan view of the rails.

Referring to the drawings the numeral 1 is used to designate a pair of rails supported in the usual manner by means of suitable ties 2. Mounted upon the rails 1 are a pair of wheels 3.

The treads of the rails 1 or of the wheels 3 have formed therein at regular intervals parallel inclined grooves 4, the adjacent ends of adjacent grooves overlapping a transverse line on said treads to give an even support for the wheels 3 when rolling or moving upon said rails 1, and whereby said wheels will be in engagement with at least one of the grooves at all times.

The overlapping of the adjacent ends of adjacent grooves 4 also provides a tread having edges, formed by the edges of the grooves 4, to engage the opposite tread, or tread of the opposite member, to increase traction and to prevent lateral movement or sideways of one member relatively to the other.

This latter feature is obtained by reason of the fact that the grooves 4 in the tread of either member are oppositely inclined to the grooves in the opposite corresponding member.

In operation the rotation of the wheels 3 upon the tread of the rails 1 will cause the treads of said wheels 3 to engage oppositely inclined edges of the grooves 4 and thereby provide greater traction and as the direction of inclination of said edges is substantially transverse to the direction of movement of said wheels 3 upon said rails 4 it is obvious that a resistance will be presented which will prevent slipping of said wheels 3 in either direction upon said treads of the rails 1, thereby increasing traction and tending to prevent lateral movement of one member relatively to the other.

Having thus described my invention, what I claim as new and desire to secure by Letters Patent is:

1. The combination with a pair of members comprising rails and wheels arranged to ride thereupon of inclined grooves formed in the tread of each of said members, the grooves of one member being oppositely inclined to the grooves of the other corresponding member, to increase traction and to prevent lateral movement of one pair of members relatively to the other pair.

2. The combination with a pair of members comprising rails and wheels arranged to ride thereupon of inclined grooves formed in the tread of each of the members, the grooves of one member being oppositely inclined to the other corresponding member to increase traction and prevent lateral movement of one pair of members relatively to the other pair, said grooves overlapping a transverse line on said treads whereby the wheel will be in continuous engagement with at least one of the grooves at all times.

CHARLES E. SCOTT.